Patented Dec. 13, 1938

2,139,664

UNITED STATES PATENT OFFICE 2,139,664

PROCESS OF STABILIZING CELLULOSE DERIVATIVES

Rudolph S. Bley, Elizabethton, Tenn., assignor to North American Rayon Corporation, New York, N. Y., a corporation of Delaware No Drawing. Application November 22, 1937, Serial No. 175,979

9 Claims. (Cl. 260—102)

The present invention relates to a process of purifying and stabilizing saturated cellulose esters.

One object of this invention is to provide for a process of stabilizing a saturated cellulose ester by treating a crude, saturated cellulose ester with anhydrous, liquid ammonia.

Another object of my invention is to provide for a process of stabilizing a crude, saturated cellulose ester by treating it with anhydrous, liquid ammonia at a temperature at which it is not decomposed by said ammonia.

A further object of this invention is to provide for a process of stabilizing a crude, saturated cellulose ester by treating it with anhydrous, liquid ammonia at or below its boiling point.

A further object of my invention is to provide for a process of purifying and/or stabilizing a crude, saturated cellulose ester by treating it with anhydrous, liquid ammonia in the presence of an auxiliary agent, said agent being inert to, i. e., incapable of chemically reacting with, said ammonia.

Other objects of my invention will become apparent to those skilled in the art from a study of the following specification.

Saturated cellulose esters, i. e., cellulose completely esterified with saturated radicals, are conventionally produced by causing alkali metal cellulosates to react with acid halides, such as acetyl chloride, propionyl chloride, etc., or by treating cellulose with organic acid anhydrides in the presence of acid catalysts. Acid catalysts commonly used in the esterification of cellulose are for example, sulphuric acid, nitric acid, hydrochloric acid, thionyl chloride, phosphorus pentoxide, phosphorus oxychloride, selenic acid, pyridinium acid sulphate, sulphur dioxide, phosgene, zinc chloride, perchloric acid, sulpho-acetic acid, sulphinic acids, halogenated fatty acids, lower molecular fatty acids, halogenated fatty acid anhydrides, naphthalene sulphonic acids, p-toluene sulphochloride, etc. This esterification of cellulose may also be carried out in the presence of organic compounds incapable of dissolving fully esterified cellulose in order to obtain it in fibrous and/or granular form. Furthermore, this esterification may be carried out in such a manner that mixed cellulose esters, i. e., esters having at least two different ester groups, are obtained.

However, although these reactions run smoothly in the presence of acid catalysts, the saturated cellulose esters contain impurities, such as lower substituted esters, side reaction products and catalyst residues, these residues causing discolorations of artificial products formed from such esters.

Innumerable attempts have been made to stabilize cellulose triacetate in solid form by removing the acidic catalysts contained therein since it has the valuable property of being more hydrophobic than cellulose diacetate. U. S. Patent 1,954,729 to Dreyfus, of April 10, 1934, discloses the stabilization of cellulose derivatives by treating them with an aliphatic alcoholic amine in the presence of sodium hypochlorite, etc. U. S. Patent 2,091,921 to Malm et al., of November 5, 1935, relates to a process of stabilizing cellulose triacetate by treating it with a petroleum distillate having a boiling range of about 150–200° C. Sindl (vide U. S. Patent 2,066,584 of January 5, 1937) stabilizes cellulose triacetate containing sulphuric acid residues in a swelled state with a mixture of a lower fatty acid and a liquid ester of a lower fatty acid. U. S. Patent 2,071,333 to Dreyfus, of February 23, 1937, removes the acid catalysts by treating crude cellulose triacetate with steam. Alkali fluorides and borates are used for the same purpose by Ellis et al., as disclosed in their U. S. Patent 2,072,253 of March 2, 1937. U. S. Patent 2,072,260 to Hanney, of March 2, 1937, discloses the elimination of acid catalysts from crude cellulose triacetate by means of water-insoluble salts of basic character. Martin (vide U. S. Patent 2,072,270 of March 2, 1937) neutralizes the acid residues with sodium acetate, etc. U. S. Patent 2,095,334 to Jones, of October 12, 1937, relates to a process of stabilizing cellulose triacetate by passing through it a hot 0.01 to 0.03% sulphuric acid solution. Malm and Fordyce (vide U. S. Patent 2,095,822 of October 12, 1937) remove the acid catalyst of cellulose triacetate with butyric acid, etc.

Furthermore, I am well aware that cellulose has been rendered more reactive by treating it with liquid ammonia (vide U. S. Patent 1,173,336, to Bronner, of February 29, 1916), and that U. S. Patents 1,966,756 to Gajewski and 2,012,382 to Fink, discloses the dissolution of fibroin in anhydrous, liquid ammonia. I am also well aware that cellulose diacetate has been dissolved in liquid, anhydrous ammonia to form solutions from which artificial products may be spun, as set forth for example in U. S. Patent 1,544,809 to Clancy of July 7, 1925, and that nitrogeneous cellulose derivatives have been prepared by causing ammonia in anhydrous alcohol to react with cellulose esters having unsaturated radicals in accordance with a process disclosed in U. S. Patent 2,073,052 to Dreyfus, of March 9, 1937.

By experimentation, I have unexpectedly found that crude, saturated cellulose esters can be stabilized by treating them with anhydrous, liquid ammonia. During this treatment the lower substituted cellulose esters are separated from the saturated cellulose esters and the acid catalysts, contained therein, are removed with the formation of innocuous ammonium salts which are either soluble or insoluble in anhydrous, liquid ammonia. Insoluble ammonium salts may be removed from the purified esters by washing. Esters formed by chemical interaction between acid halides or anhydrides and the acid catalysts are generally ammonolyzed in liquid, anhydrous ammonia. Although I prefer to use anhydrous, liquid ammonia at its boiling point, i. e., at about $-33°$ C., my process may be carried out at temperatures below $-33°$ C. by evacuating the container in which the crude, saturated cellulose ester is treated with anhydrous, liquid ammonia. In this manner, a complete stabilization and purification of a crude, saturated cellulose ester may be achieved even at a temperature of about $-50°$ C. Furthermore, it is also within the scope of the present invention to stabilize and purify a crude, saturated cellulose ester by treating it in a closed container at any defined temperature above $-33°$ C. at which it is resistant to chemical attack by anhydrous, liquid ammonia. Each saturated cellulose ester has such a critical temperature which must be predetermined by experiment.

The stabilizing of a crude, saturated cellulose ester, as set forth above, may also be carried out in the presence of an auxiliary agent or a plurality of auxiliary agents. Auxiliary agents, in accordance with my present invention, are such compounds which are miscible with or capable of being dissolved in anhydrous, liquid ammonia without decomposition by chemical reaction, i. e., compounds which are inert to anhydrous, liquid ammonia. In addition, these auxiliary agents must be such compounds as are incapable of decomposing the saturated cellulose esters. They may, furthermore, be compounds capable of dissolving incompletely saturated cellulose esters. These auxiliary agents may be organic or inorganic compounds, such as benzene, ethers, esters, alcohols, metal nitrates, ammonium salts, metal sulfites, etc. They allow a very prolonged treatment of saturated cellulose esters at temperatures above $-33°$ C. with anhydrous, liquid ammonia, and may be added to anhydrous, liquid ammonia to assist in removing incompletely saturated esters contained in crude, saturated esters.

In carrying out my stabilizing, I introduce a crude, saturated cellulose ester, either in a dissolved or fibrous form, into a Dewar flask or a similar container filled with anhydrous, liquid ammonia and let it remain therein until the residual, incompletely saturated esters have been dissolved and the acid catalyst neutralized. The following table depicts the results obtained by varying the duration of treatment:

Table

| Duration of treatment | Residual catalyst in saturated cellulose ester before treatment | Catalyst content of saturated cellulose ester after treatment |
| --- | --- | --- |
| Hours | Percent by weight | Percent by weight |
| 1 | 1.5 | 0.068 |
| 2 | 1.5 | 0.036 |
| 3 | 1.78 | 0.024 |
| 4 | 1.78 | 0.017 |
| 5 | 1.78 | 0.012 |
| 15 | 1.78 | 0.0 |

Example I

About 50 grams of cellulose linters are completely acetylated with 1475 ml. of acetic anhydride in the presence of 40 grams of concentrated sulphuric acid and 2640 ml. of ethyl acetate. The fibrous cellulose triacetate, after a preliminary wash, contains about 1.78% of sulphuric acid by weight. About 8 grams of this crude triacetate are introduced into about 300 ml. of anhydrous, liquid ammonia at a temperature of about $-33°$ C. for about 4 hours. The fibrous triacetate is separated by decantation from the ammonia containing dissolved cellulose diacetate, ammonium sulphate and other impurities and subsequent evaporation of residual ammonia. The purified, stabilized triacetate contains about 0.017% of sulphuric acid. It is completely soluble in chloroform, dioxane and other triacetate solvents. By prolonging this treatment, the sulphuric acid can be completely removed. The process can be carried out at lower or higher temperatures. Auxiliary agents may be added to the anhydrous, liquid ammonia.

Example II

About 28 grams of propionic acid, 70 grams of glacial acetic acid, 150 grams of acetic anhydride (85%), and 0.5 gram of sulphuric acid (spec. grav. 1.85) and 50 grams of a purified cotton are thoroughly mixed. This mixture is maintained for about 6 hours at a temperature of about 10 to 25° C. to form a clear dope. The product is precipitated and washed. It is chloroform-soluble and consists of fully esterified cellulose acetate propionate containing about 30% acetyl and 18% propionyl. It contains about 1.2% by weight of sulphuric acid. About 10 grams of this cellulose acetate propionate are introduced into about 300 ml. of anhydrous, liquid ammonia for about 5 hours. The sulphuric acid content is reduced to 0.013%. The sulphuric acid can be completely removed by prolonged treatment. A suitable auxiliary agent in this treatment is, for example, benzene. The temperature at which the stabilization and purification is carried out may be varied.

Example III

About 27.7 grams of sodium stearate are mixed with about 10.2 grams of chloracetyl chloride to form an intimate mixture which is heated under reflux at a temperature of about 100° C. for about 6 hours. The mass is filtered while hot with about 200 ml. of ethylene chloride. The filtered ethylene chloride is re-added to the mass to which about 0.2 cc. of a catalyst, consisting of 1 part by volume of sulphuric acid and 3 parts by volume, of phosphoric acid, is added. About 5 grams of a cellulose acetate having an acetyl value of about 35% are treated in this mixture for about two days at a temperature of about 55° C. The clear dope is diluted with ethylene chloride, filtered and precipitated in methyl alcohol. The resulting product, saturated cellulose acetate stearate, dissolves in benzene and chloroform. It contains about 2.0% of residual catalyst. After treating this cellulose acetate stearate for about 20 hours in anhydrous, liquid ammonia it is practically devoid of acid residues. Methyl alcohol, for example, may be used as auxiliary agent.

Although these examples will serve to illustrate my invention, I wish to emphasize that any saturated, cellulose ester may be stabilized and/or purified in anhydrous liquid ammonia, that the treatment may be carried out at lower and higher temperatures, that the duration of treatment may be varied within wide limits without decomposing the esters that other auxiliary agents may be used with equal success, and that the crude, saturated esters may be prepared with any acid catalyst known in the art. Modifications of my invention will readily be recognized by those skilled in the art, and I desire to include all such modifications and variations coming within the scope of the appended claims. In these claims the term "crude, saturated cellulose ester" embraces cellulose esters devoid of free hydroxyl and unsaturated ester groups capable of reacting with anhydrous, liquid ammonia and which in addition to acidic residues may also contain other impurities, such as lower substituted cellulose esters, esters formed by chemical interaction of acid catalysts and esterifying agents, etc. The term "stabilizing" embraces the removal of the acidic residues and other impurities, such as lower substituted cellulose esters, esters formed by chemical interaction of the acid catalyst and esterifying agents, etc., from crude, saturated cellulose esters. Furthermore, the term "anhydrous, liquid ammonia" is intended to comprise the liquefied gas having the formula $NH_3$ which, however, may contain such amounts of water as are unavoidable in the liquefaction when operated on a commercial scale.

I claim:

1. The process of stabilizing a saturated cellulose ester which comprises introducing a crude, saturated fatty acid ester of cellulose into anhydrous, liquid ammonia and subsequently separating said ammonia from said ester, said ester being substantially insoluble in said ammonia.

2. The process of stabilizing a saturated cellulose ester which comprises introducing a crude, saturated fatty acid ester of cellulose into anhydrous, liquid ammonia at a temperature of about $-33°$ C. and subsequently separating said ammonia from said ester said ester being substantially insoluble in said ammonia.

3. The process of stabilizing a saturated cellulose ester which comprises introducing a crude, saturated fatty acid ester of cellulose into anhydrous, liquid ammonia at a temperature below $-33°$ C. and subsequently separating said ammonia from said ester, said ester being substantially insoluble in said ammonia.

4. The process of stabilizing a saturated cellulose ester which comprises introducing a crude, saturated fatty acid ester of cellulose into anhydrous, liquid ammonia in the presence of an auxiliary agent and subsequently separating said ammonia from said ester, said agent being inert to said ammonia and said ester being substantially insoluble in said ammonia.

5. The process of stabilizing a saturated fatty acid ester of cellulose which comprises introducing a crude, saturated fatty acid ester of cellulose into anhydrous, liquid ammonia at temperature of about $-33°$ C. in the presence of an auxiliary agent and subsequently separating said ammonia from said ester, said agent being inert to said ammonia and said ester being substantially insoluble therein.

6. The process of stabilizing a saturated fatty acid ester of cellulose which comprises introducing a crude, saturated fatty acid ester of cellulose into anhydrous, liquid ammonia at a temperature below $-33°$ C. in the presence of an auxiliary agent and subsequently separating said ammonia from said ester, said agent being inert to said ammonia and said ester being substantially insoluble therein.

7. A stable saturated fatty acid ester of cellulose prepared in accordance with the process set forth in claim 1.

8. A stable saturated fatty acid ester of cellulose prepared in accordance with the process set forth in claim 2.

9. A stable saturated fatty acid ester of cellulose prepared in accordance with the process set forth in claim 3.

RUDOLPH S. BLEY.